United States Patent [19]

Wu

[11] Patent Number: 5,156,509
[45] Date of Patent: Oct. 20, 1992

[54] WATERPROOF SCREW FASTENER

[76] Inventor: Szu-Hsien Wu, No. 55, Hsueh-Tang Rd., Jen-Mei Ts'un, Niao-Sung Hsiang, Kaohsiung Hsien, Taiwan

[21] Appl. No.: 753,903

[22] Filed: Sep. 3, 1991

[51] Int. Cl.$^5$ .............................................. F16B 33/00
[52] U.S. Cl. .................... 411/369; 411/371; 411/377; 411/402; 411/542; 411/915
[58] Field of Search ............... 411/369, 371, 373, 377, 411/402, 410, 431, 542, 387, 408, 919, 915

[56] References Cited

U.S. PATENT DOCUMENTS

| | | | |
|---|---|---|---|
| 641,191 | 1/1900 | Champion | 411/402 |
| 3,087,370 | 4/1963 | Iaia | 411/369 |
| 3,202,033 | 8/1965 | Weidner, Jr. | 411/369 X |
| 3,247,752 | 4/1966 | Greenleaf et al. | 411/542 |
| 3,452,636 | 7/1969 | Cohen et al. | 411/371 |
| 3,656,396 | 4/1972 | Gutshall | 411/919 X |
| 3,897,712 | 8/1975 | Black | 411/533 X |
| 4,084,478 | 4/1978 | Simmons | 411/919 X |
| 4,295,767 | 10/1981 | Temple, Jr. | 411/377 |
| 4,373,842 | 2/1983 | Bettini et al. | 411/377 |
| 4,749,321 | 6/1988 | Knohl et al. | 411/369 X |
| 4,887,951 | 12/1989 | Hashimoto | 411/377 X |

FOREIGN PATENT DOCUMENTS

| | | | |
|---|---|---|---|
| 953009 | 3/1964 | United Kingdom | 411/377 |
| 2113337 | 8/1983 | United Kingdom | 411/369 |

Primary Examiner—Rodney M. Lindsey
Attorney, Agent, or Firm—Nixon & Vanderhye

[57] ABSTRACT

A waterproof screw fastener includes a head having a top and a bottom end, and a threaded shank downwardly extending from the bottom end of the head. The bottom end of the head has an indentation around the threaded shank. A sealing washer is sleeved onto the threaded shank and received in the indentation of the bottom end of the head.

3 Claims, 3 Drawing Sheets

WATERPROOF SCREW FASTENER

BACKGROUND OF THE INVENTION

1. Field of the Invention

The invention relates to a screw, more particularly to an improved waterproof screw fastener.

2. Description of the Related Art

Screw fasteners are used to join building materials such as plastic roofing boards. Referring to FIGS. 1 and 2, a conventional screw fastener (1) includes a head (11), a threaded shank (10) extending downwards from the head (11), and a sealing washer (12) sleeved onto the threaded shank (10) below the head (11). The head (11) has an upper hexagonal portion provided with six flat side faces (13). The sealing washer (12) is made of an elastic material. A wrench (20) having a bore with six inner faces (21) is used to hold the upper hexagonal portion of the head (11) and to turn the screw fastener (1) joining two separate members (22, 23). The sealing washer (12) is pressed by the head (11) in order to prevent water from seeping through the engaging holes of the members (22, 23). When the sealing washer (12) is pressed by the head (11), the periphery of the sealing washer (12) extends outwards and is not covered or protected by the head (11). The periphery of the sealing washer (12) is easily exposed to the elements, thereby easily and wearing the sealing washer (12) and shortening its effective service life. In addition, the screw fastener (1) does not have a good outward appearance.

The inner faces (21) of the wrench (20) gradually wear after a long period of use. The engagement between the flat side faces (13) of the head (11) and the inner faces (21) of the wrench (20) therefore becomes loose. Thus, when the wrench (20) is used to turn the screw fastener (1), the wrench (20) does not properly engage and easily detaches from the screw fastener (1).

SUMMARY OF THE INVENTION

Therefore, the objective of the invention is to provide a waterproof screw fastener having an improved construction. The sealing washer of the waterproof screw fastener has a longer effective service life. The wrench is able to tightly engage the head of the waterproof screw fastener and faces no risk of untimely detachment.

Accordingly, a waterproof screw fastener of this invention includes a head having a top and a bottom end, and a threaded shank downwardly extending from the bottom end of the head. The bottom end of the head has an indentation formed thereon around the threaded shank. A sealing washer is sleeved onto the threaded shank and received in the indentation of the bottom end of the head.

BRIEF DESCRIPTION OF THE DRAWING

Other features and advantages of the present invention will become apparent in the following detailed description of the preferred embodiments with reference to the accompanying drawings, of which.

DETAILED DESCRIPTION OF THE PREFERRED EMBODIMENTS

Figures 1, 2:
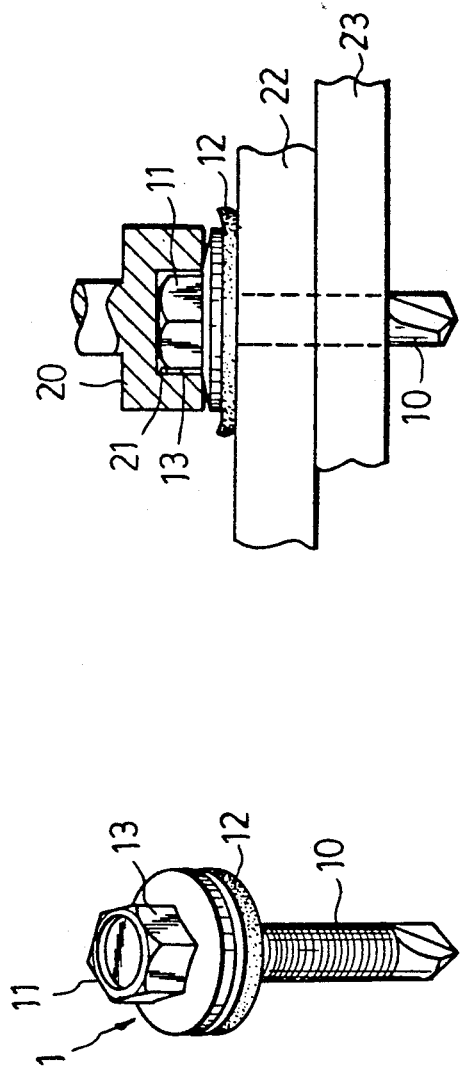
FIG. 1 is a perspective view of a conventional screw fastener.
FIG. 2 shows that the conventional screw fastener is used to join two separate members.
Figure 4:
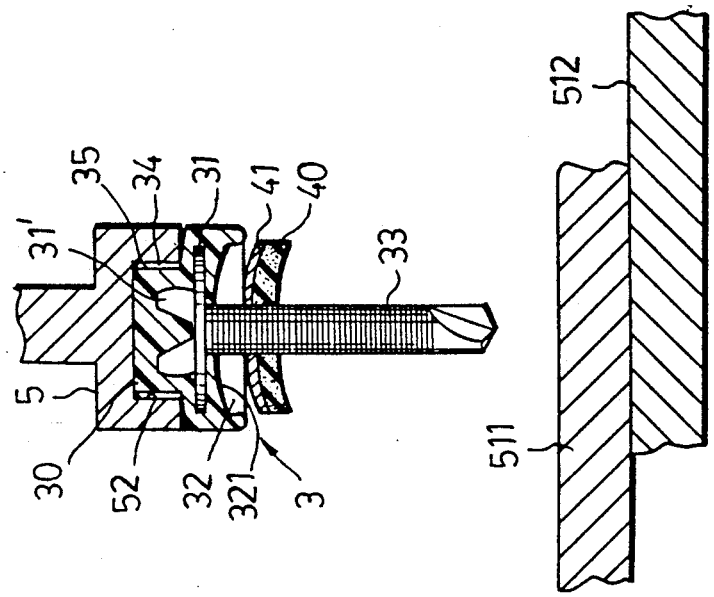
FIG. 4 is a sectional view of the preferred embodiment.
Figure 3:
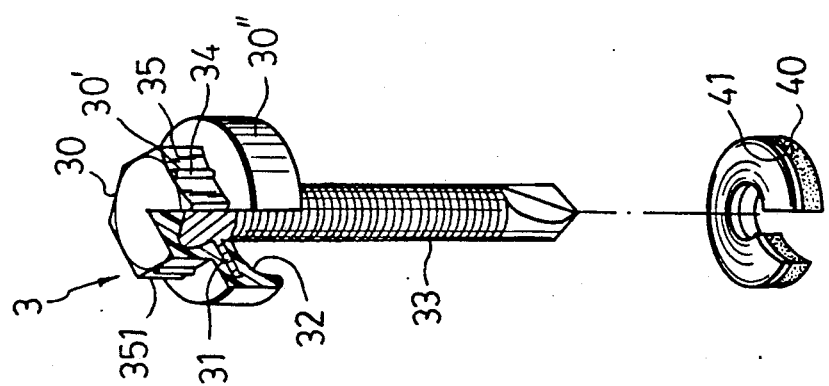
FIG. 3 is an exploded sectional view of a preferred embodiment of a waterproof screw fastener of this invention.

Referring to FIGS. 3 and 4, a waterproof screw fastener (3) of this invention includes a head (30) having a top and a bottom end (30', 30"), and a threaded shank (33) downwardly extending from the bottom end (30") of the head (30). The head (30) of the waterproof screw fastener (3) is made of a rigid plastic material. The bottom end (30") of the head (30) has an annular indentation (32) formed thereon around the threaded shank (33). The indentation (32) has a concaved surface (321). The top end (30') of the head (30) has six side faces (35) each of which has a radially projecting and axially extending rib (34) formed thereon. The threaded shank (33) is made of a metal material and has an annular flange (31) and a pair of upward projections (31') encapsulated in the plastic head (30). The waterproof screw fastener (3) further includes an annular elastic sealing washer (40) and an annular metal member (41) disposed above the sealing washer (40). The sealing washer (40) and the metal member (41) each have a convex outer surface to fit in the indentation (32) and abut on the concaved surface (321) of the indentation (32). The sealing washer (40) and the metal member (41) are sleeved onto the threaded shank (33) and received in the indentation (32) of the bottom end (30") of the head (30). The sealing washer (40) can be made of a rubber material having good abrasion resistance.

Figure 5:
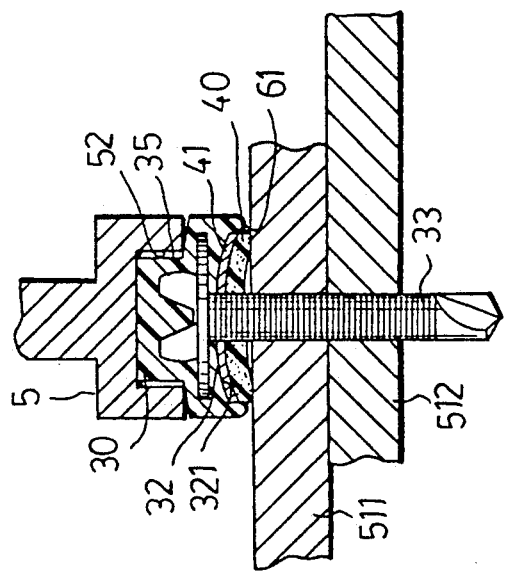
FIG. 5 is a sectional view of the preferred embodiment which is used to join two separate members.

Referring to FIG. 5, a wrench (5) having a bore with six inner faces (52) is used to hold the head (30) and turn the waterproof screw fastener (3) joining two separate members (511, 512). The sealing washer (40) is pressed by the head (30) attached to the member (511) and received in the indentation (32) to prevent water from seeping through the engaging holes of the members (511, 512). The sealing washer (40) is generally covered and protected by the head (30) and there is only little clearance (61) between the bottom end (30") of the head (30) and the member (511). The sealing washer (40) is no more unduly exposed to the elements, so it is no more easily worn out and has a longer effective service life. In addition, the waterproof screw fastener (3) has a good outward appearance.

Due to the ribs (34) of the side faces (35) of the head (30), when the wrench (5) is used to turn the waterproof screw fastener (3), the wrench (5) always properly engages and does not easily detach from the waterproof screw fastener (3) although the inner faces (52) of the wrench (5) are subject to wear after a long period of use.

Figure 6:
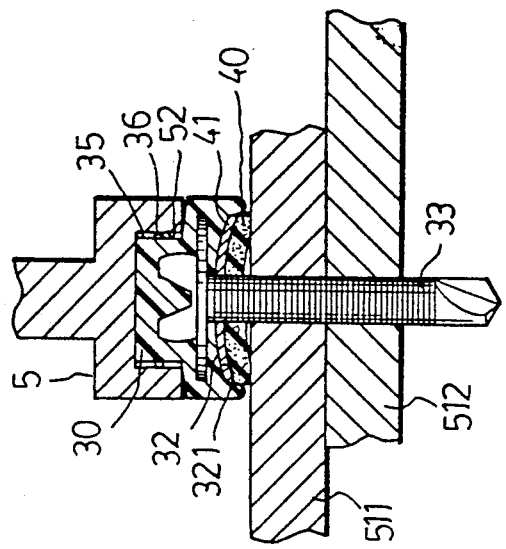
FIG. 6 is a sectional view of another preferred embodiment of this invention which is used to join two separate members.

Referring to FIG. 6, each of the side faces (35) of the head (30) has a projecting stub (36) formed thereon instead of the rib (34) in FIG. 3.

The plastic head (30) of the waterproof screw fastener (3) of this invention can be made of a variety of colors as desired to satisfy the customers's needs.

While the present invention has been described in connection with what is considered the most practical and preferred embodiment, it is understood that this invention is not limited to the disclosed embodiment, but is intended to cover various arrangements included within the spirit and scope of the broadest interpretations and equivalent arrangements.

I claim:

1. A waterproof screw fastener comprising:

a metallic threaded shank having a top end formed with an outward extending flat annular flange and two projections extending upwardly and outwardly from a top face of said flat annular flange;

a plastic head completely encapsulating said annular flange and said projections, said plastic head having an upper head body which has a lower end and a lower skirt part which extends radially, outwardly and then downwardly from said lower end of said upper head body;

said lower skirt part having a rounded top bearing face and a bottom face being rounded and concave to confine a recess about said threaded shank;

a resilient sealing washer sleeved onto said threaded shank and receive din said recess of said lower skirt part;

said lower skirt part enclosing said resilient sealing member and exerting forces directed on said sealing washer upon threading said fastener, compressing said sealing washer in a radially inward direction;

said rounded top bearing face and said bottom face of said lower skirt part forming an arch structure and providing an increased bearing capacity for the pressure acting thereon;

said annular flange having a dimension greater than that of the cross-section of said upper head body and extending radially outward into said lower skirt part so as to strengthen said lower skirt part.

2. A waterproof screw fastener as claimed in claim 1, wherein said head is hexagonal having six side faces, at least one of said side faces having a projection formed thereon.

3. A waterproof screw fastener as claimed in claim 2, wherein said projection is an axially extending rib.

* * * * *